US010976197B2

(12) United States Patent
Kim et al.

(10) Patent No.: US 10,976,197 B2
(45) Date of Patent: Apr. 13, 2021

(54) OPTICAL APPARATUS USING REFLECTION GEOMETRY

(71) Applicant: SAMSUNG ELECTRONICS CO., LTD., Suwon-si (KR)

(72) Inventors: Jineun Kim, Suwon-si (KR); Hoyoung Ahn, Suwon-si (KR); Unjeong Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/668,943

(22) Filed: Oct. 30, 2019

(65) Prior Publication Data

US 2020/0240838 A1 Jul. 30, 2020

(30) Foreign Application Priority Data

Jan. 29, 2019 (KR) .................. 10-2019-0011306

(51) Int. Cl.
| G01J 3/02 | (2006.01) |
| G01J 3/10 | (2006.01) |
| G02B 3/06 | (2006.01) |
| G01J 3/12 | (2006.01) |

(52) U.S. Cl.
CPC ........... *G01J 3/0208* (2013.01); *G01J 3/0218* (2013.01); *G01J 3/0229* (2013.01); *G01J 3/10* (2013.01); *G02B 3/06* (2013.01); *G01J 2003/102* (2013.01); *G01J 2003/1213* (2013.01)

(58) Field of Classification Search
CPC .... G01J 3/0208; G01J 3/02; G01J 3/00; G01J 3/10; G01J 3/28; G01J 3/18; G01J 3/36
See application file for complete search history.

(56) References Cited

U.S. PATENT DOCUMENTS

| 4,881,802 A | 11/1989 | Stankewitz |
| 5,112,127 A | 5/1992 | Carrabba et al. |
| 6,259,557 B1 | 7/2001 | Miyashita et al. |
| 7,006,690 B1 * | 2/2006 | Imura ................ G01J 3/10 |
| | | 382/167 |
| 2007/0195263 A1 | 8/2007 | Shimizu et al. |

(Continued)

FOREIGN PATENT DOCUMENTS

| EP | 0 290 733 A1 | 11/1988 |
| EP | 3 130 954 A1 | 2/2017 |

(Continued)

OTHER PUBLICATIONS

Communication dated Jun. 19, 2020, issued by the European Patent Office in European Application No. 20154077.0.

*Primary Examiner* — Abdullahi Nur
(74) *Attorney, Agent, or Firm* — Sughrue Mion, PLLC (57) ABSTRACT

Provided is an optical apparatus using reflection geometry. The optical apparatus includes a lens element disposed to face an object to be measured, a light source generating an incident beam that passes through the lens element to be incident on the object, and a photodetector receiving light that is scattered by the object. The incident beam is obliquely incident on the object off an optical center axis of the lens element, without passing through the optical center axis. The scattered light is transmitted to the photodetector by passing through the optical center axis of the focusing lens element and a region therearound.

33 Claims, 11 Drawing Sheets

(56) References Cited

U.S. PATENT DOCUMENTS

| | | | |
|---|---|---|---|
| 2010/0053599 A1* | 3/2010 | Milster | G01J 3/2823 356/51 |
| 2013/0278749 A1 | 10/2013 | Mandelis et al. | |
| 2014/0192355 A1 | 7/2014 | Froigneux et al. | |
| 2015/0308896 A1 | 10/2015 | Darty | |

FOREIGN PATENT DOCUMENTS

| JP | 2010-139465 A | 6/2010 |
|---|---|---|
| WO | 2013/014379 A1 | 1/2013 |

* cited by examiner

< COMPARATIVE EXAMPLE >

OPTICAL APPARATUS USING REFLECTION GEOMETRY

CROSS-REFERENCE TO RELATED APPLICATION

This application is based on and claims priority from Korean Patent Application No. 10-2019-0011306, filed on Jan. 29, 2019, in the Korean Intellectual Property Office, the disclosure of which is incorporated herein in its entirety by reference.

BACKGROUND

1. Field

Apparatuses consistent with the present disclosure relate to optical apparatuses using reflection geometry.

2. Description of Related Art

Most reflective collection optics according to the related art use a dichroic mirror. Incident light is perpendicularly radiated to a sample by being reflected at 45° from a dichroic mirror, and the light reflected from the sample transmits through the dichroic mirror. However, as the dichroic mirror is typically arranged by tilting at 45°, space for the arrangement is needed and an optical path is extended. Furthermore, when the incident light perpendicularly radiated to the sample is reflected out, many cutoff filters for removing unnecessary reflection light are used. Accordingly, in connection with the use of a dichroic mirror, the size of a system increases, the optical path is extended, and manufacturing costs increase.

SUMMARY

Provided are optical apparatuses (reflective optical apparatuses) that use reflection geometry that is advantageous for miniaturization and reducing weight. Further, provided are reflective optical apparatuses that have a relatively simple structure without using a dichroic mirror. Further still, provided are reflective optical apparatuses which may reduce an optical path and manufacturing costs.

Additional aspects will be set forth in part in the description which follows and, in part, will be apparent from the description, or may be learned by practice of the presented embodiments.

In accordance with an aspect of an example embodiment, a reflective optical apparatus includes a lens element disposed to face an object to be measured; a light source configured to generate an incident beam that passes through the lens element to be incident on the object; and a photodetector configured to receive light that is scattered by the object; wherein the incident beam is obliquely incident on the object off an optical center axis of the lens element, without passing through the optical center axis, and wherein the scattered light is transmitted to the photodetector by passing through the optical center axis of the lens element and a region around the optical center axis.

A ray of the incident beam may be incident on the object by passing through a first region of the lens element, the first region being located between the optical center axis and an edge of the lens element, without passing through the optical center axis of the lens element.

The first region may be disposed closer to the edge of the lens element than to the optical center axis of the lens element.

Reflected light of the incident beam that is directly reflected by the object may travel off the optical center axis, without passing through the optical center axis of the focusing lens element.

The reflective optical apparatus may further include a longpass filter disposed between the lens element and the photodetector.

The reflective optical apparatus may further include a guide member disposed between the object and the lens element, wherein the guide member has a barrel shape.

The guide member may include an aperture configured to expose a partial region of the object.

The lens element may include a first lens disposed at a center of the lens element; and a second lens disposed around the first lens, wherein the second lens has a donut shape and is configured to focus the incident beam on the object.

The lens element may include at least one lens unit disposed on a periphery of the lens element in a direction perpendicular to the optical center axis of the lens element, and the at least one lens unit may have a ball shape and may be configured to focus the incident beam on the object.

The incident beam may be one from among a plurality of incident beams that are incident on the object through the lens element.

The plurality of incident beams may have a same wavelength.

The plurality of incident beams may include a first incident beam having a first wavelength and a second incident beam having a second wavelength different from the first wavelength.

The photodetector may include an image sensor or a spectroscopic sensor.

The reflective optical apparatus may further include a relay optical system disposed between the lens element and the photodetector, wherein the relay optical system includes a first relay lens, a second relay lens, and a pinhole plate having a pinhole, the pinhole plate being disposed between the first relay lens and the second relay lens.

The reflective optical apparatus may further include a fiber-type coupler configured to transmit to the photodetector the scattered light that has passed through the lens element.

The reflective optical apparatus may be configured not to include a dichroic mirror.

The incident beam may include a laser.

The scattered light may include any one from among a Raman signal generated by the object, a fluorescence signal, and a photoluminescence signal.

In accordance with an aspect of an example embodiment, an optical apparatus includes a first light source configured to emit light; a lens configured to focus the light emitted by the first light source onto an object; and a sensor configured to sense light scattered by the object, wherein the light emitted by the first light source is incident upon a first edge region of the lens without being incident upon a center region of the lens.

The sensor may be positioned to receive the light scattered by the object without receiving light that is specularly reflected by the object.

An optical axis of the lens may pass through the sensor.

An optical axis of the lens may pass through the sensor without passing through the first light source.

The optical apparatus may further include a lowpass filter positioned between the lens and the sensor.

The lens may be further configured to focus the light scattered by the object as it travels toward the sensor.

The optical apparatus may further include a guide member configured to house the lens, and the guide member may include an aperture through which the light focused by the lens is incident upon the object and through which the light scattered by the object is incident upon the lens.

The lens may include a first lens configured to focus the light emitted by the first light source onto the object and a second lens configured to focus the light scattered by the object.

The first lens may have a ring shape and may surround the second lens.

The first edge region of the lens may have a ball shape, and light emitted by the first light source may be incident upon the first edge region of the lens that has the ball shape.

The optical apparatus may further include a second light source configured to emit light, and the light emitted by the second light source may be incident upon a second edge region of the lens without being incident upon the center region of the lens, the second edge region being different from the first edge region.

The first light source and the second light source may be configured to emit light of a same wavelength.

The first light source may be configured to emit light having a first wavelength, and the second light source may be configured to emit light having a second wavelength different from the first wavelength.

The optical apparatus may further include a first relay lens positioned between the lens and the sensor, the first relay lens being configured to focus; a second relay lens positioned between the first relay lens and the sensor; and a pinhole plate positioned between the first relay lens and the second relay lens, wherein the light scattered by the object passes through the lens, the first relay lens, the pinhole plate, and the second relay lens before being incident upon the sensor.

The optical apparatus may further include a relay lens positioned between the lens and the sensor; and a fiber member positioned between the relay lens and the sensor, wherein the light scattered b the object passes through the lens, the relay lens, and the fiber member before being incident upon the sensor.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to example embodiments, examples of which are illustrated in the accompanying drawings, wherein like reference numerals refer to like elements throughout. In this regard, example embodiments may have different forms and should not be construed as being limited to the descriptions set forth herein. Accordingly, example embodiments are merely described below, by referring to the figures, to explain aspects of the disclosure. As used herein, the term "and/or" includes any and all combinations of one or more of the associated listed items. Expressions such as "at least one of," when preceding a list of elements, modify the entire list of elements and do not modify the individual elements of the list.

Hereinafter, optical apparatuses (reflective optical apparatuses) using reflection geometry according to example embodiments are described in detail with reference to the accompanying drawings. In the drawings, the width and thicknesses of layers and regions are exaggerated for clarity of the specification and for convenience of explanation.

Figure 1:
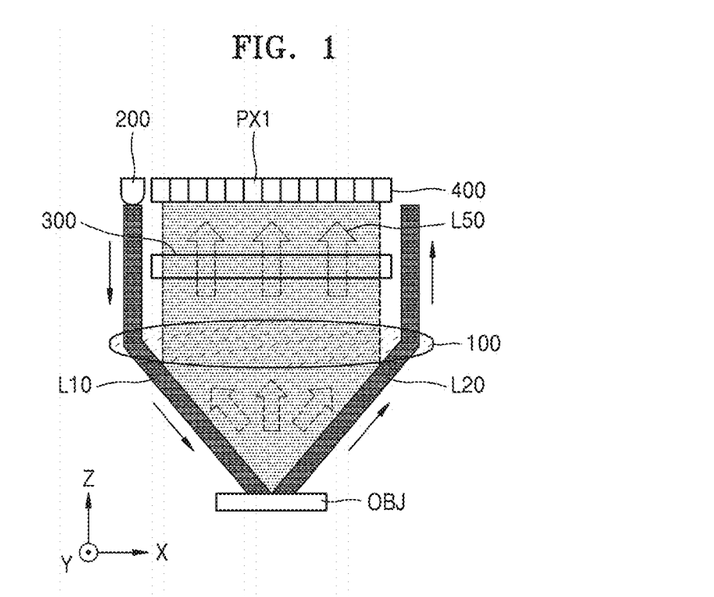
FIG. 1 is a cross-sectional view of an optical apparatus (reflective optical apparatus) using reflection geometry, according to an example embodiment.

FIG. 1 is a cross-sectional view of an optical apparatus (hereinafter, referred to as a reflective optical apparatus) using reflection geometry, according to an example embodiment.

Referring to FIG. 1, a reflective optical apparatus according to an example embodiment may include a focusing lens element (i.e., condensing lens member, collection lens member, or lens element) 100 arranged to face an object (sample) OBJ to be measured, a light source 200 generating an incident beam L10 that is incident on the object OBJ via the focusing lens element 100, and a photodetector 400 receiving scattered light L50 generated from the object OBJ by the incident beam L10.

The incident beam L10 may be obliquely incident on the object OBJ off the optical center axis of the focusing lens element 100, without passing through the optical center axis of the focusing lens element 100. In other words, the incident beam L10 may be incident on the object OBJ by passing through an outer portion of the focusing lens element 100, not through the central portion of the focusing lens element 100. In other words, a ray (e.g., a chief ray) of the incident beam L10 may be incident on the object OBJ after passing through a first region of the focusing lens element 100 that is between the optical center axis and an edge of the focusing lens element 100, without passing through the optical center axis of the focusing lens element 100. The first region may be located closer to the edge of the lens element than to the optical center axis of the focusing lens element 100. Reflected light L20 that is obtained as the incident beam L10 is directly reflected by the object OBJ may travel off the optical center axis, without passing through the optical center axis of the focusing lens element 100. The reflected light L20 may be light that collides against the object OBJ and comes out therefrom, while maintaining the directionality of the incident beam L10. Accordingly, the reflected light L20 has a symmetrical relation with the incident beam L10 and may therefore represent a specular reflection of the incident beam L10. The reflected light L20 may not be incident on the photodetector 400, or may be incident on an inactive region of the edge of the photodetector 400. When necessary, a beam block for blocking the reflected light L20 may be further provided between the focusing lens element 100 and the photodetector 400. The incident beam L10 may include a laser beam. The reflected light L20 may therefore also be a sort of laser beam.

For convenience of explanation, a region on which the incident beam L10 is incident and a region from which the reflected light L20 is reflected are illustrated to be separate from each other in the object OBJ. However, the incident region may be identical to the reflection region. The optical apparatus according to an example embodiment may be referred to as an optical apparatus using "reflection geometry" because it utilizes the reflection of the incident beam L10 and the scattering thereof.

Scattered light L50 generated from the object OBJ by the incident beam L10 (i.e., light of the incident beam L10 that is scattered by the object OBJ) may be transmitted to the photodetector 400 by passing through the optical center axis of the focusing lens element 100 and a region therearound. The scattered light L50 may be light that travels by being scattered in a random direction or a new direction, without maintaining the directionality of the incident beam L10, and may therefore represent a diffuse reflection of the incident beam L10. The scattered light L50 may include information related to the object OBJ. For example, the scattered light L50 may include any one of a Raman signal, a fluorescence signal, and a photoluminescence (PL) signal, which are generated by the object OBJ.

The photodetector 400 may receive and detect the scattered light L50. The photodetector 400 may include a plurality of pixel regions PX1, and the pixel regions PX1 may be arranged in two dimensions. The photodetector 400 may include an image sensor or a spectroscopic sensor. For example, the photodetector 400 may include a general image sensor, an op-chip spectrometer, or a hyperspectral image sensor.

In an example embodiment, the scattered light L50 may be easily and effectively transmitted to the photodetector 400, and the reflected light L20 may travel without being substantially incident on the photodetector 400. Furthermore, the reflective optical apparatus according to an example embodiment may not include a dichroic mirror (DM), that is, may have a DM-free structure. Accordingly, an optical path may be reduced, the size of an optical apparatus may be reduced, the structure may be simplified, and the manufacturing costs may be saved.

The reflective optical apparatus according to an example embodiment may further include a longpass (LP) filter 300 between the focusing lens element 100 and the photodetector 400. The LP filter 300 may transmit part of the scattered light L50 having a wavelength range of a certain wavelength (reference wavelength) or more. The LP filter 300 may selectively transmit only that part of the scattered light L50 that is necessary for detection. Furthermore, the LP filter 300 may be provided on a traveling path of the reflected light L20 such that the LP filter 300 may block the reflected light L20.

Figure 2:
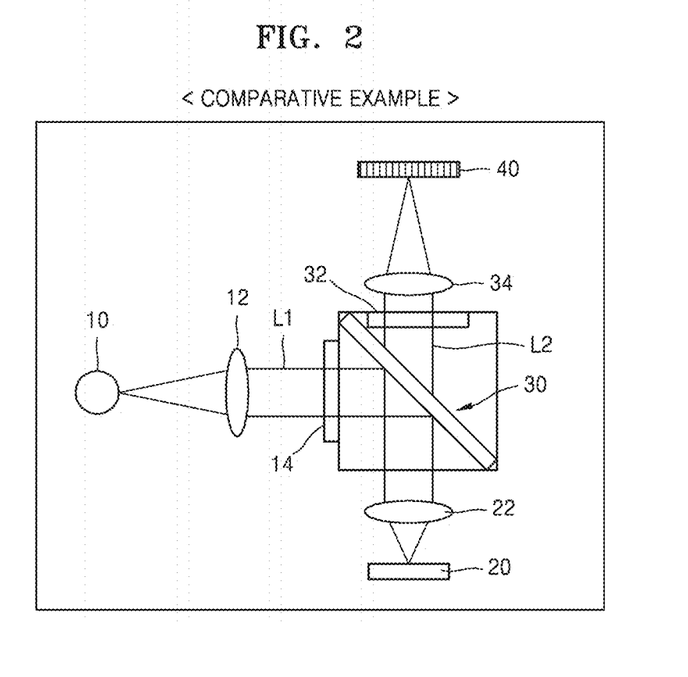
FIG. 2 is a cross-sectional view of a reflective optical apparatus according to a comparative example.

FIG. 2 is a cross-sectional view of a reflective optical apparatus according to a comparative example.

Referring to FIG. 2, the reflective optical apparatus according to a comparative example may include a dichroic mirror 30 arranged between a light source 10 and an object 20. The dichroic mirror 30 may be tilted by 45° with respect to the optical axis of light emitted by the light source 10. A first lens unit 12 and an excitation filter 14 may be arranged between the light source 10 and the dichroic mirror 30, and a second lens unit 22 may be arranged between the object 20 and the dichroic mirror 30. An image sensor 40 may be arranged to face the object 20 with the dichroic mirror 30 therebetween. An emission filter 32 and a third lens unit 34 may be arranged between the dichroic mirror 30 and the image sensor 40.

Light L1 generated by the light source 10 is reflected from the dichroic mirror 30 and radiated to the object 20. Light L2 reflected/scattered by the object 20 may be incident on the image sensor 40 by passing through the dichroic mirror 30.

As the dichroic mirror 30 is typically tilted by 45°, space for the arrangement is necessary, and thus an optical path is extended. Furthermore, when the incident light perpendicularly radiated to the object 20 is reflected by the object 20, unnecessary reflected light may be incident on the image sensor 40, and thus many cutoff filters are used to remove the unnecessary reflected light. For example, many emission filters 32 may be necessarily used. Accordingly, in connection with the use of the dichroic mirror 30, the size of a system increases, an optical path is extended, and the manufacturing costs increase.

Figure 3A:
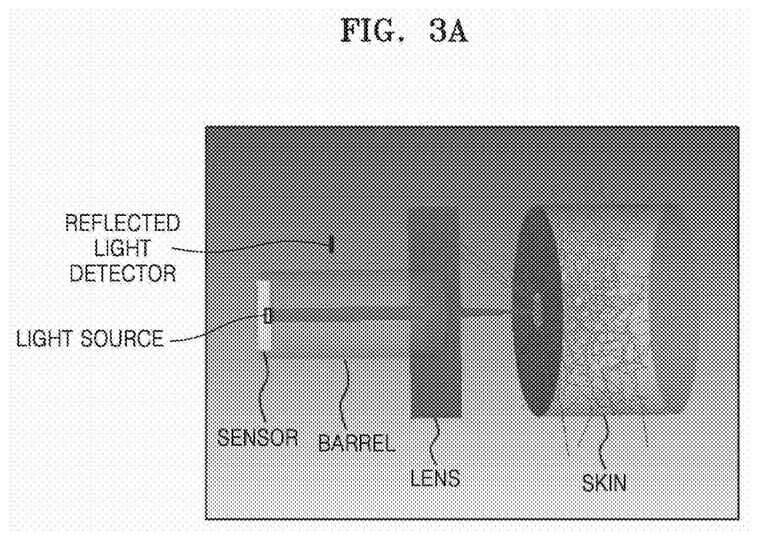
FIGS. 3A to 3C illustrate a result of simulation assuming a reflective optical apparatus according to a comparative example.
Figure 3B:
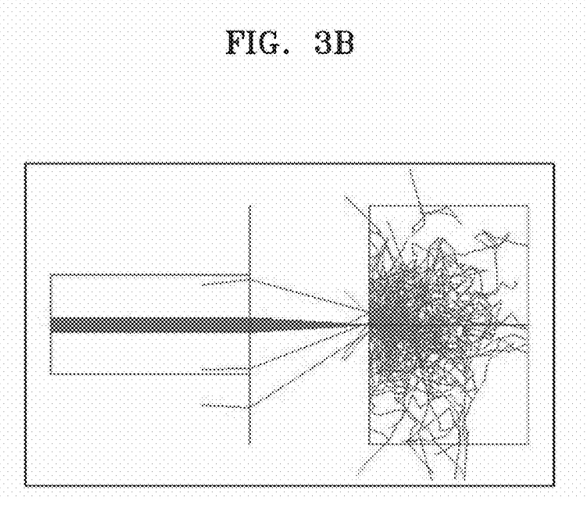
Figure 3C:
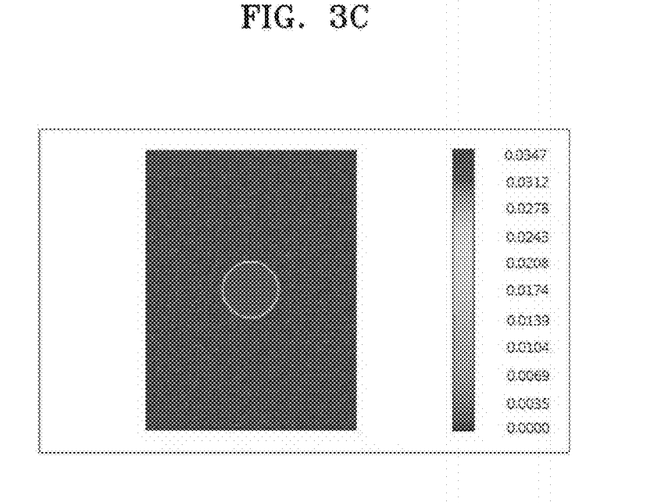

FIGS. 3A to 3C illustrate a result of simulation assuming a reflective optical apparatus according to a comparative example. FIGS. 4A to 4D illustrate a result of simulation assuming a reflective optical apparatus according to an example embodiment. In the simulations of FIGS. 3A to 3C and FIGS. 4A to 4D, ZEMAX is used as a simulation tool, a sensor (photodetector) uses a 4E8 sensor area as a base area, a paraxial lens is used as a lens for simple calculation, and human skin is used as an object (sample). In the human skin, Fresnel scattering is used as a reference.

In the simulation, an optical system is arranged in the order of sensor (photodetector)-barrel-lens-skin as shown in FIG. 3A. The size of the sensor is 1.5 mm×2 mm. The radius and the length of the barrel (for Raman light guide) are 1.25 mm and 5 mm, respectively. The radius and the focal length of the lens are 3 mm and 3 mm, respectively, and a skin surface is located at the focal point. The radius, the length, and the refractive index of a barrel-shaped portion of the skin are 3 mm, 4 mm, and 1.5, respectively. It is assumed that there is an aperture having a radius of 0.525 mm in the skin surface. Henyey-Greenstein bulk scattering parameters, which are scattering-related parameter values, are assumed such that g value=0.85, mean path=0.1 mm, and Transmission=1.0. The light intensity of the light source is assumed to be 1 mW, and the light distribution is assumed to be parallel light having a radius of 0.2 mm.

FIG. 3A illustrates a shaded model of a system in a simulation of a reflective optical apparatus according to a comparative example. The sensor, the barrel, the lens, and the skin are arranged in order. The incident light is incident on the skin through the optical axis of the lens and then reflected from the skin to travel to the sensor.

FIG. 3B illustrates a layout of FIG. 3A by simplifying the same. FIG. 3C illustrates the shape and intensity of light detected by the sensor (photodetector).

FIGS. 3A to 3C illustrate a case in which, assuming that a dichroic mirror is used, incident light is incident along the optical axis of a lens. In this case, the amount of light reaching the sensor (photodetector) is 0.0347 W/cm2. The amount of light reaching the sensor (photodetector) is a sum of the amount of directly reflected light of the incident light and the amount of the scattered light generated by the incident light.

Figure 4A:
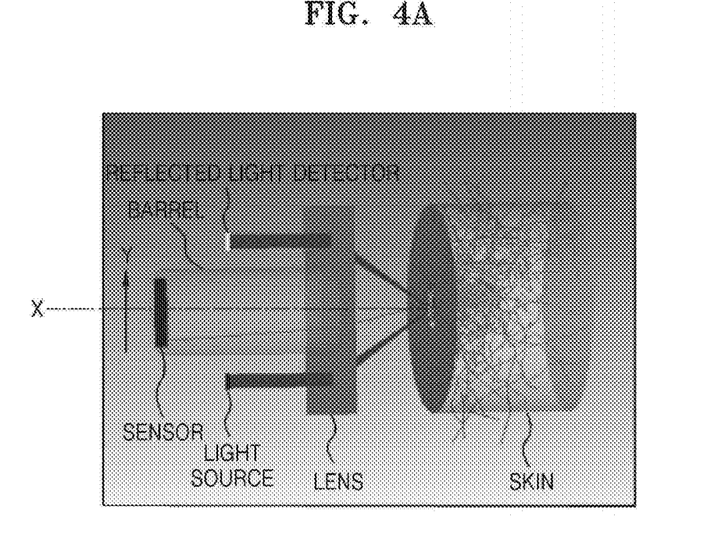
FIGS. 4A to 4D illustrate a result of simulation assuming a reflective optical apparatus according to an example embodiment.

FIG. 4A illustrates a shaded model of a system in a simulation of the reflective optical apparatus according to an example embodiment. The sensor, the barrel, the lens, and the skin are arranged in order. As shown in FIG. 4A, the light source is located at a position of coordinates (x, y)=(+2 mm, −2 mm) from a center of the sensor, and a directly reflected light detector (reflected light detector) is located at a position of coordinates (x, y)=(+2 mm, +2 mm) from the center of the sensor. The incident light is obliquely incident on the object (skin) from a direction different from that of the optical axis of the lens, without passing through the optical axis of the lens. The directly reflected light of the incident light (reflected light) travels to the reflected light detector, and the scattered light generated by the incident light travels to the sensor.

Figure 4B:
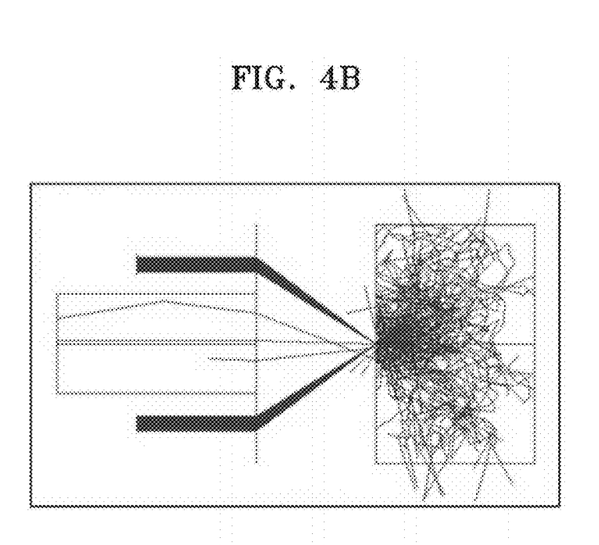
Figure 4C:
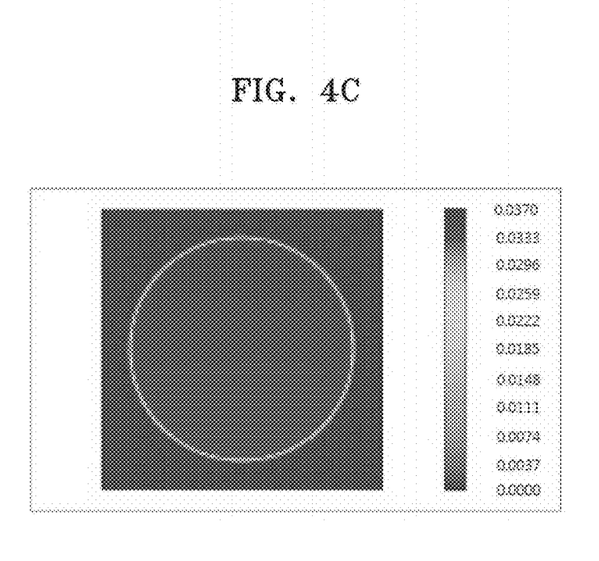
Figure 4D:
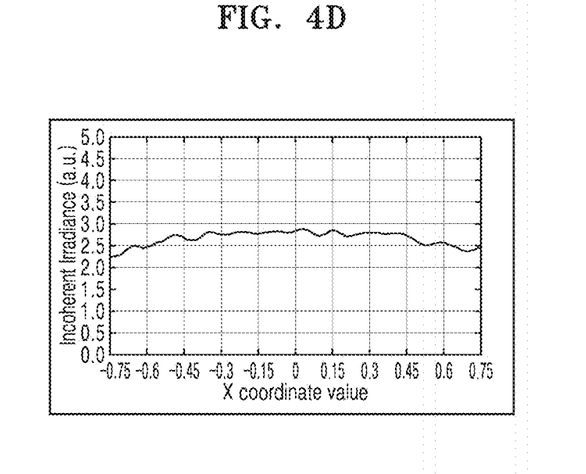

FIG. 4B illustrates the layout of FIG. 4A by simplifying the same. FIG. 4C illustrates the shape and intensity of light detected by the sensor (photodetector). FIG. 4D is a graph showing a change in the intensity of light according to the position at a surface of the sensor (photodetector).

The intensity of the reflected light detected by the reflected light detector in the example embodiment of FIGS. 4A to 4D was 0.037 W/cm$^2$, and the amount of the light reaching the sensor (photodetector) was 0.000295 W/cm$^2$. The amount of light reaching the sensor (photodetector) is the amount of the scattered light generated by the incident light scattered by the object.

The amounts of light reaching the sensor (photodetector) in a perpendicular incidence case (comparative example) and an oblique incidence case are 0.0347 W/cm$^2$ and 0.000295 W/cm$^2$, respectively. The amount of light reaching the sensor in the case of oblique incidence is therefore about 100 times less than the amount of light reaching the sensor in the case of perpendicular incidence. In the case of oblique incidence according to an example embodiment, the reflected light that is not necessary for the sensor is not incident upon the sensor but is instead reflected away from the sensor. As such, as the amount of light reaching the sensor (photodetector) is reduced by about 100 times, the number of cutoff filters may be reduced, and thus the effects such as reduction of manufacturing costs, a decrease in the length of an optical path, and miniaturization and saving weight of an optical system may be obtained.

Figure 5:
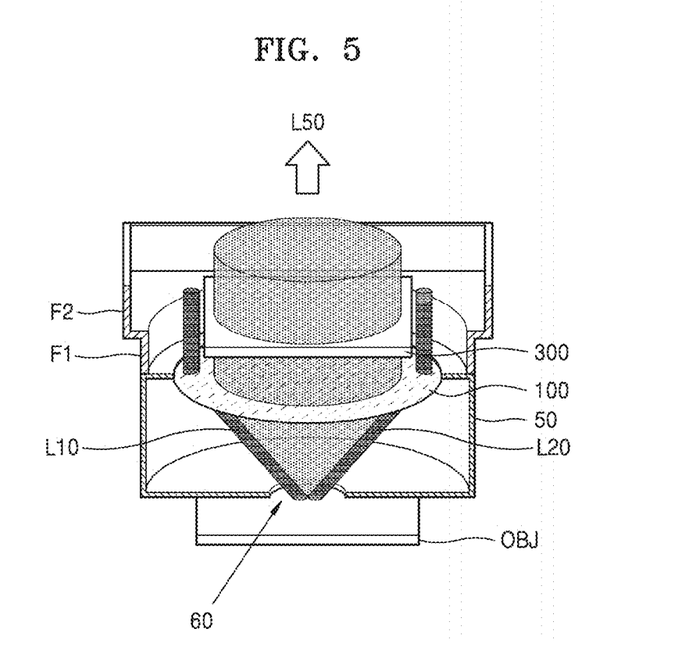
FIG. 5 is a perspective view (partially cut-away perspective view) of a reflective optical apparatus according to an example embodiment.

FIG. 5 is a perspective view (partially cut-away perspective view) of a reflective optical apparatus according to an example embodiment.

Referring to FIG. 5, the reflective optical apparatus according to an example embodiment may further include a barrel-type guide member 50 arranged between the object OBJ and the focusing lens element 100. In other words, the barrel-type guide member 50 may have a barrel shape. The barrel-type guide member 50 may include an aperture 60 that exposes a partial region of the object OBJ.

When the incident light L10 is incident through the outer portion of the focusing lens element 100, the incident light L10 needs to be precisely focused on a surface of the object OBJ. To this end, a guide member 50 may be further provided as a device for fixing the distance from the focusing lens element 100 to the object OBJ and blocking external light. The guide member 50 has a circular aperture 60 at the center thereof through which light travels to be incident upon the object OBJ. As the light scattered from the region on the object OBJ is focused by the focusing lens element 100, signal noise may be reduced, thereby obtaining a clearer result. For convenience of explanation, in FIG. 5, the photodetector that receives the scattered light L50 is not illustrated. In FIG. 5, reference numerals F1 and F2 denote a first frame structure and a second frame structure, respectively.

Although in FIG. 5 a positional relation of the incident beam L10, the reflected light L20, and the LP filter 300 is roughly illustrated for convenience of explanation, actually, the positional relation thereof may be the same as or similar to that described in FIG. 1. This is applied to the relation to be described later with reference to FIGS. 11 and 12.

FIGS. 6 to 10 are perspective views of various shapes of focusing lens elements and incident beams applicable to various reflective optical apparatuses according to example embodiments.

Figure 6:
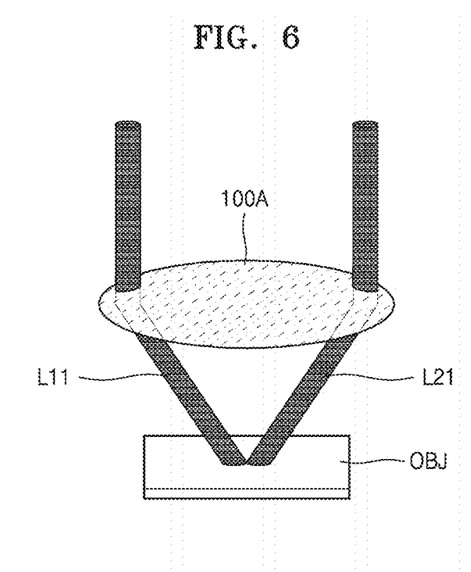
FIG. 6 is a perspective view of a focusing lens element and an incident beam applicable to a reflective optical apparatus according to an embodiment.

FIG. 6 is a perspective view of a focusing lens element 100A and an incident beam L11 applicable to a reflective optical apparatus according to an example embodiment.

Referring to FIG. 6, the incident beam L11 may be obliquely incident on the object OBJ from a direction different from that of the optical center axis of the focusing lens element 100A, without passing through the optical center axis of the focusing lens element 100A. Reflected light L21 that is directly reflected from the object OBJ may travel in another direction different from that of the optical center axis without passing through the optical center axis of the focusing lens element 100A. The structure of FIG. 6 may be similar to that described in FIG. 1.

Figure 7A:
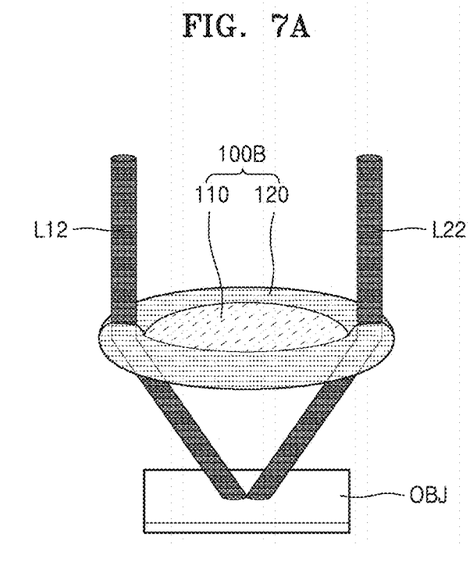
FIG. 7A is a perspective view of a focusing lens element and an incident beam applicable to a reflective optical apparatus according to an example embodiment.
Figure 7B:
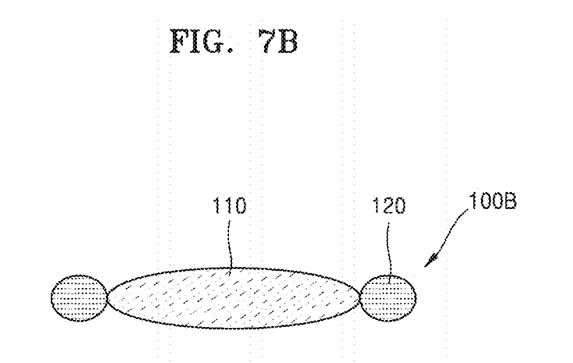
FIG. 7B is a cross-sectional view of a sectional structure of the focusing lens element of FIG. 7A.

FIG. 7A is a perspective view of a focusing lens element 100B and an incident beam L12 applicable to a reflective optical apparatus according to an example embodiment. FIG. 7B is a cross-sectional view of a sectional structure of the focusing lens element 100B of FIG. 7A.

Referring to FIGS. 7A and 7B, the focusing lens element 100B may include a first lens 110 located at the center thereof and a donut-type second lens (i.e., a second lens) 120 arranged around the first lens 110. The donut-type second lens 120 may have a sort of tube shape (i.e., a donut shape or a ring shape). The donut-type second lens 120 may be configured to focus the incident beam L12 on the object OBJ. Reference numeral L22 denotes reflected light. When the incident beam L12 is focused by using the donut-type second lens 120 located at an outer portion of the focusing lens element 100B, the shape of a light spot of the incident beam L12 may be well-formed.

Figure 8A:
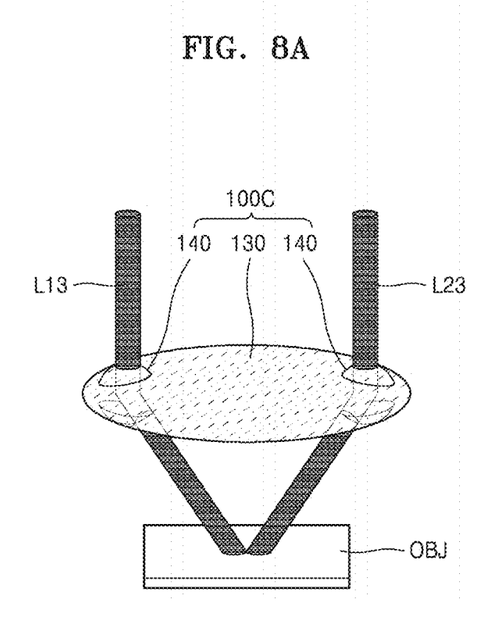
FIG. 8A is a perspective view of a focusing lens element and an incident beam applicable to a reflective optical apparatus according to an example embodiment.
Figure 8B:
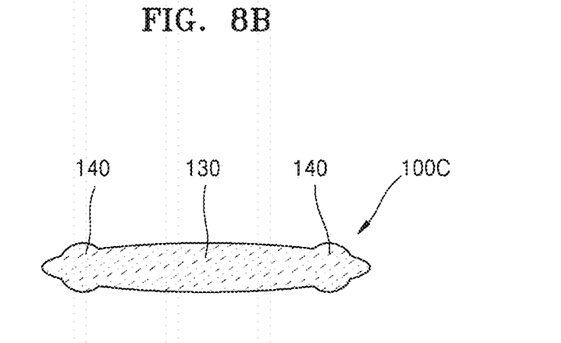
FIG. 8B is a cross-sectional view of a sectional structure of the focusing lens element of FIG. 8A.

FIG. 8A is a perspective view of a focusing lens element 100C and an incident beam L13 applicable to a reflective optical apparatus according to an example embodiment. FIG. 8B is a cross-sectional view of a sectional structure of the focusing lens element 100C of FIG. 8A.

Referring to FIGS. 8A and 8B, the focusing lens element 100C may include a lens main body unit 130 and at least one ball-type lens unit (i.e., at least one lens unit) 140 arranged in an outer region of the lens main body unit 130. In other words, the at least one ball-type lens unit may be located on a periphery of the focusing lens element 100C in a direction perpendicular to the optical axis of the focusing lens element 100C. The ball-type lens unit 140 may have a ball shape and may be configured to focus the incident beam L13 on the object OBJ. Furthermore, reflected light L23 may exit the focusing lens element 100C through another ball-type lens unit 140. When the ball-type lens unit 140 is in use, the shape of a light spot may be well-formed to be circular as the incident beam L13 reaches the object OBJ and optical power may be well transmitted to the object OBJ.

Figure 9:
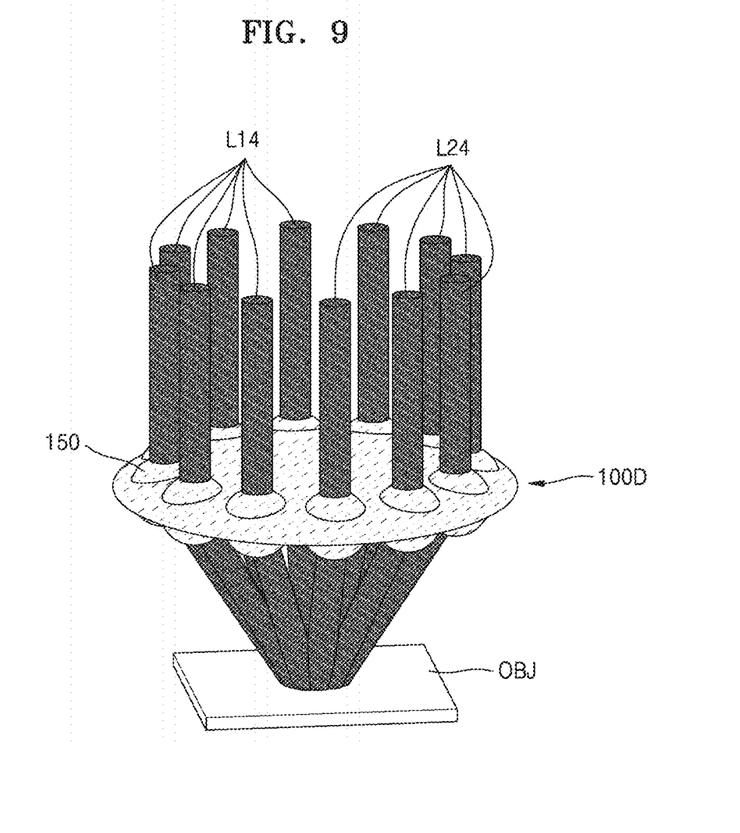
FIG. 9 is a perspective view of a focusing lens element and incident beams applicable to a reflective optical apparatus according to an example embodiment.
Figure 10:
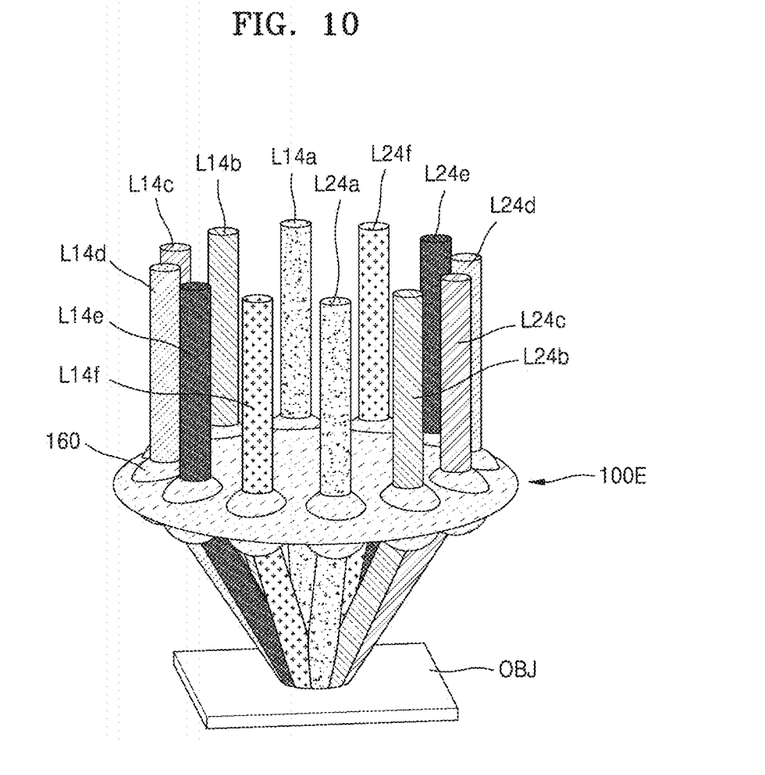
FIG. 10 is a perspective view of a focusing lens element and incident beams applicable to a reflective optical apparatus according to an example embodiment.

According to an example embodiment, a plurality of incident beams may be incident on an object through a focusing lens element, and examples thereof are illustrated in FIGS. 9 and 10.

FIG. 9 is a perspective view of a focusing lens element 100D and incident beams L14 applicable to a reflective optical apparatus according to another example embodiment.

Referring to FIG. 9, the focusing lens element 100D may include a plurality of ball-type lens units (i.e., a plurality of lens units) 150 arranged in an outer region thereof. The incident beams L14 may be obliquely incident on the object OBJ, and a plurality of reflected lights L24 corresponding to the incident beams L14 may be reflected by the object OBJ. Optical power may be greatly increased by using the incident beams L14. The incident beams L14 may each have substantially the same wavelength. In this case, the arrangement methods of the incident beams L14 and the reflected lights L24 as shown in FIG. 9 are examples and may vary. For example, according to an example embodiment, the incident beams L14 and the reflected lights L24 may be alternately arranged.

FIG. 10 is a perspective view of a focusing lens element 100E and incident beams L14a to L14f applicable to a reflective optical apparatus according to an example embodiment.

Referring to FIG. 10, the focusing lens element 100E may include a plurality of ball-type lens units (i.e., a plurality of lens units) 160 arranged in an outer region thereof. The incident beams L14a to L14f may be obliquely incident on the object OBJ, and a plurality of reflected lights L24a to L24f corresponding to the incident beams L14a to L14f may be reflected by the object OBJ. At least two of the incident beams L14a to L14f may have different wavelengths. In other words, the central wavelengths of at least two of the incident beams L14a to L14f may be different from each other. The at least two of the incident beams L14a to L14f having different wavelengths may be applied for various purposes. The arrangement methods of the incident beams L14a to L14f and the reflected lights L24a to L24f are examples and may vary.

Figure 11:
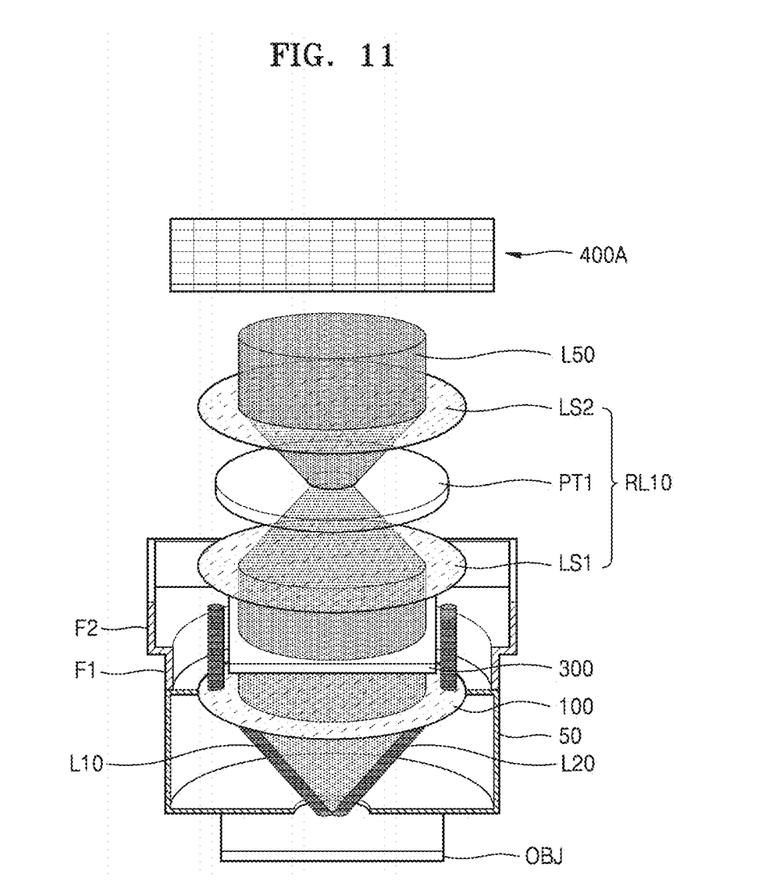
FIG. 11 is a perspective view (partially cut-away perspective view) of a reflective optical apparatus according to an example embodiment.

FIG. 11 is a perspective view (partially cut-away perspective view) of a reflective optical apparatus according to an example embodiment.

Referring to FIG. 11, the reflective optical apparatus according to an example embodiment may further include a relay optical system RL10 arranged between the focusing lens element 100 and a photodetector 400A. The relay optical system RL10 may be arranged between the LP filter 300 and the photodetector 400A. The relay optical system RL10 may include, for example, a first relay lens LS1, a second relay lens LS2, and a pinhole plate PT1 having a pinhole and arranged between the first relay lens LS1 and the second relay lens LS2. The scattered light L50 may be transmitted to the photodetector 400A via the first relay lens LS1, the pinhole of the pinhole plate PT1, and the second relay lens LS2. When the relay optical system RL10 is in use, noise of an optical signal may be reduced. The configuration of the relay optical system RL10 disclosed above is an example, and embodiments are not limited thereto.

Figure 12:
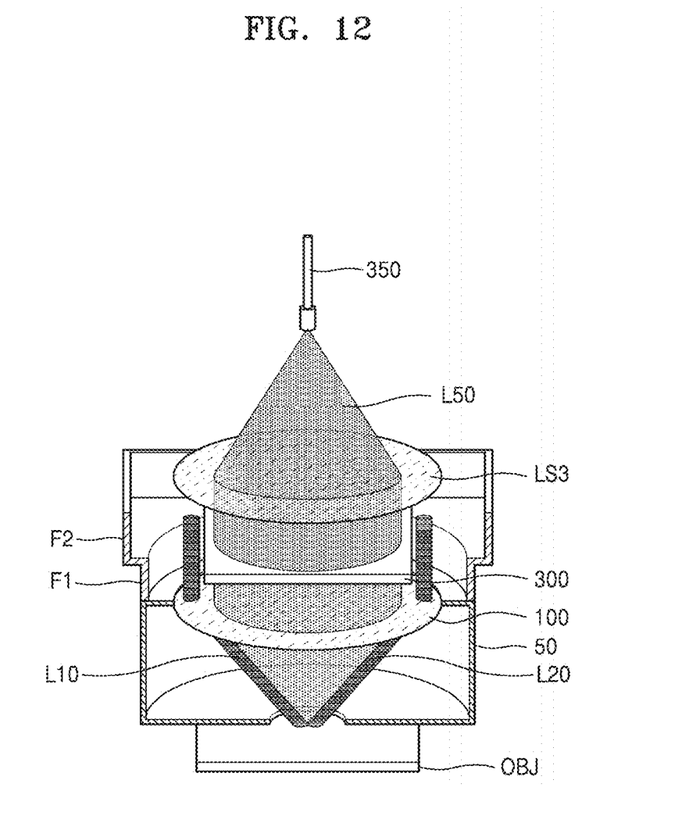
FIG. 12 is a perspective view (partially cut-away perspective view) of a reflective optical apparatus according to an example embodiment.

FIG. 12 is a perspective view (partially cut-away perspective view) of a reflective optical apparatus according to an example embodiment.

Referring to FIG. 12, the reflective optical apparatus according to an example embodiment may further include a fiber-type coupler (i.e., a fiber coupler) 350 that transmits the scattered light L50 that has passed through the focusing lens element 100, to a photodetector. The fiber-type coupler 350 may be optically connected to the photodetector via an exit portion. Furthermore, the reflective optical apparatus according to an example embodiment may further include a lens unit LS3 for focusing the scattered light L50 on the coupler 350.

The above-described reflective optical apparatus according to an example embodiment may have a DM-free structure. Accordingly, the optical path may be decreased, the size of an optical apparatus may be reduced, the configuration may be simplified, and the manufacturing costs may be saved. The light that is directly reflected from the object is not incident, or may not be substantially incident, on the photodetector. Accordingly, unnecessary reflected light may be easily removed. In this regard, the configuration of a system may be simplified or light efficiency may be improved.

It should be understood that example embodiments described herein should be considered in a descriptive sense only and not for purposes of limitation. Descriptions of features or aspects within each example embodiment should typically be considered as available for other similar features or aspects in other example embodiments. For example, one of ordinary skill in the art could have known that the structure of the reflective optical apparatus described with reference to, e.g., FIG. 1 and FIGS. 5 to 12 may be variously changed. As an example, the structure of the focusing lens element can be variously changed to a single lens or multiple lenses (multiple lenses arranged in an optical axis direction), and the position of the light source or other optical elements can be changed. While one or more example embodiments have been described with reference to the figures, it will be understood by those of ordinary skill in the art that various changes in form and details may be made therein without departing from the spirit and scope as defined by the following claims.

What is claimed is:
1. A reflective optical apparatus comprising:
a lens element disposed to face an object to be measured;
a light source configured to generate an incident beam that passes through the lens element to be incident on the object; and
a photodetector configured to receive scattered light that is scattered by the object;
wherein the incident beam is obliquely incident on the object off an optical center axis of the lens element, without passing through the optical center axis,
wherein the scattered light is transmitted to the photodetector by passing through the optical center axis of the lens element and a region around the optical center axis, and
wherein the light source is positioned outside the optical center axis of the lens element, and the photodetector is arranged to face the lens element.

2. The reflective optical apparatus of claim 1, wherein a ray of the incident beam is incident on the object by passing through a first region of the lens element, the first region being located between the optical center axis and an edge of the lens element, without passing through the optical center axis of the lens element.

3. The reflective optical apparatus of claim 2, wherein the first region is closer to the edge of the lens element than to the optical center axis of the lens element.

4. The reflective optical apparatus of claim 1, wherein reflected light of the incident beam that is directly reflected by the object travels off the optical center axis, without passing through the optical center axis of the lens element.

5. The reflective optical apparatus of claim 1, further comprising a longpass filter provided between the lens element and the photodetector.

6. The reflective optical apparatus of claim 1, further comprising a guide member provided between the object and the lens element,
wherein the guide member has a barrel shape.

7. The reflective optical apparatus of claim 6, wherein the guide member comprises an aperture configured to expose a partial region of the object.

8. The reflective optical apparatus of claim 1, wherein the lens element comprises:
a first lens provided at a center of the lens element; and
a second lens provided around the first lens,
wherein the second lens has a donut shape and is configured to focus the incident beam on the object.

9. The reflective optical apparatus of claim 1, wherein the lens element comprises at least one lens unit provided at a periphery of the lens element in a direction perpendicular to the optical center axis of the lens element, and
wherein the at least one lens unit has a ball shape and is configured to focus the incident beam on the object.

10. The reflective optical apparatus of claim 1, wherein the incident beam is one from among a plurality of incident beams that are incident on the object through the lens element.

11. The reflective optical apparatus of claim 10, wherein the plurality of incident beams have a substantially same wavelength.

12. The reflective optical apparatus of claim 10, wherein the plurality of incident beams comprises a first incident beam having a first wavelength and a second incident beam having a second wavelength different from the first wavelength.

13. The reflective optical apparatus of claim 1, wherein the photodetector comprises an image sensor or a spectroscopic sensor.

14. The reflective optical apparatus of claim 1, further comprising a relay optical system provided between the lens element and the photodetector,
wherein the relay optical system comprises a first relay lens, a second relay lens, and a pinhole plate having a pinhole, the pinhole plate being provided between the first relay lens and the second relay lens.

15. The reflective optical apparatus of claim 1, further comprising a fiber coupler configured to transmit to the photodetector the scattered light that has passed through the lens element.

16. The reflective optical apparatus of claim 1, wherein the reflective optical apparatus is configured not to include a dichroic mirror.

17. The reflective optical apparatus of claim 1, wherein the incident beam comprises a laser.

18. The reflective optical apparatus of claim 1, wherein the scattered light comprises any one from among a Raman signal generated by the object, a fluorescence signal, and a photoluminescence signal.

19. An optical apparatus comprising:
a first light source configured to emit light;
a lens configured to focus the light emitted by the first light source onto an object; and
a sensor configured to sense light scattered by the object,
wherein the light emitted by the first light source is incident upon a first edge region of the lens without being incident upon a center region of the lens,
wherein the first light source is positioned outside an optical center axis of the lens, and the sensor is arranged to face the lens, and
wherein the light passing through the lens enters the sensor without changing a path of the light.

20. The optical apparatus of claim 19, wherein the sensor is positioned to receive the light scattered by the object without receiving light that is specularly reflected by the object.

21. The optical apparatus of claim 19, wherein an optical axis of the lens passes through the sensor.

22. The optical apparatus of claim 19, wherein an optical axis of the lens passes through the sensor without passing through the first light source.

23. The optical apparatus of claim 19, further comprising a lowpass filter positioned between the lens and the sensor.

24. The optical apparatus of claim 19, wherein the lens is further configured to focus the light scattered by the object as it travels toward the sensor.

25. The optical apparatus of claim 19, further comprising a guide member configured to house the lens,
wherein the guide member includes an aperture through which the light focused by the lens is incident upon the object and through which the light scattered by the object is incident upon the lens.

26. The optical apparatus of claim 19, wherein the lens comprises a first lens configured to focus the light emitted by the first light source onto the object and a second lens configured to focus the light scattered by the object.

27. The optical apparatus of claim 26, wherein the first lens has a ring shape and surrounds the second lens.

28. The optical apparatus of claim 19, wherein the first edge region of the lens has a ball shape, and
wherein the light emitted by the first light source is incident upon the first edge region of the lens that has the ball shape.

29. The optical apparatus of claim 19, further comprising a second light source configured to emit light,
wherein the light emitted by the second light source is incident upon a second edge region of the lens without being incident upon the center region of the lens, the second edge region being different from the first edge region.

30. The optical apparatus of claim 29, wherein the first light source and the second light source are configured to emit light of a same wavelength.

31. The optical apparatus of claim 29, wherein the first light source is configured to emit light having a first wavelength, and
wherein the second light source is configured to emit light having a second wavelength different from the first wavelength.

32. The optical apparatus of claim 19, further comprising:
a first relay lens positioned between the lens and the sensor, the first relay lens being configured to focus;

a second relay lens positioned between the first relay lens and the sensor; and a pinhole plate positioned between the first relay lens and the second relay lens, wherein the light scattered by the object passes through the lens, the first relay lens, the pinhole plate, and the second relay lens before being incident upon the sensor.

33. The optical apparatus of claim 19, further comprising:

a relay lens positioned between the lens and the sensor; and a fiber member positioned between the relay lens and the sensor, wherein the light scattered b the object passes through the lens, the relay lens, and the fiber member before being incident upon the sensor.

\* \* \* \* \*